June 10, 1952  G. J. MORRIS  2,600,363
AUDIBLE LEVELING MEANS FOR CAMERAS AND OTHER DEVICES
Filed June 29, 1950  2 SHEETS—SHEET 1

INVENTOR
GARLAND J. MORRIS
BY Shepherd & Campbell
ATTORNEYS

June 10, 1952     G. J. MORRIS     2,600,363
AUDIBLE LEVELING MEANS FOR CAMERAS AND OTHER DEVICES
Filed June 29, 1950     2 SHEETS—SHEET 2
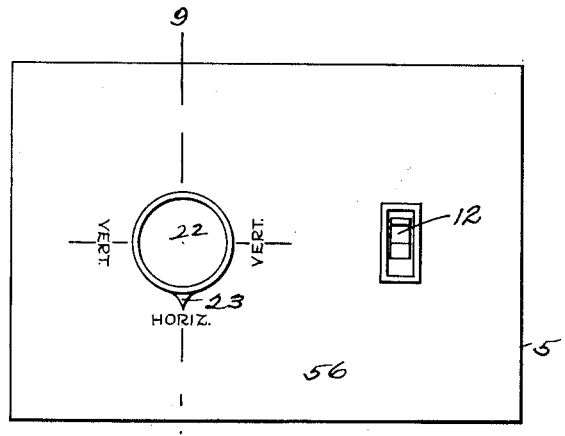
*Fig. 8*
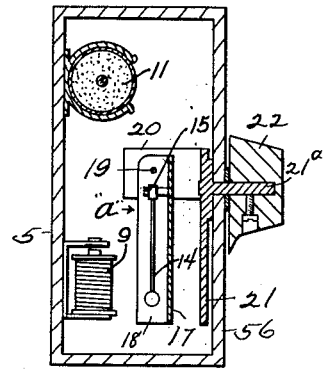
*Fig. 9*
*Fig. 10*
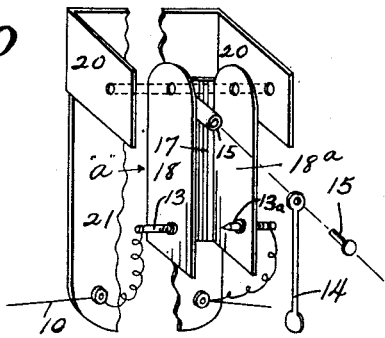
*Fig. 11*
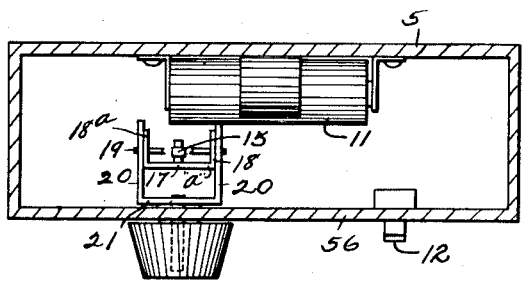
INVENTOR
GARLAND J. MORRIS
BY Shepherd & Campbell
ATTORNEYS Patented June 10, 1952

2,600,363

UNITED STATES PATENT OFFICE 2,600,363

AUDIBLE LEVELING MEANS FOR CAMERAS AND OTHER DEVICES

Garland J. Morris, Hampton, Va.

Application June 29, 1950, Serial No. 171,015

3 Claims. (Cl. 177—311)

1

This invention relates to an audible indicating level, primarily intended for use upon cameras but useful in connection with other instruments which have to be leveled under conditions where ordinarily view finders, level bubbles and the like cannot be used.

The leveling means of the present invention comprises means for giving a sensory indication, discernable by the user at a reasonable distance from the camera, whenever the camera has been tipped in either direction more than a predetermined degree out of proper alignment with the horizon. While I prefer to employ an audible signal which is included in an electric circuit, I do not exclude the use of a small electric light, the important thing being that the signal is effective without the necessity of close scrutiny of a view finder, or the like, by the user. Therefore the term sensory has been employed but I prefer the audible signal and will describe the invention in conjunction with such a signal.

Broadly stated the invention comprises a contact making pendulum hung to swing between two contact points, which makes contact with one or the other of said points to close an electric circuit and sound a buzzer, or like signal, whenever the camera is tilted more than a certain degree in either direction. Further, the pendulum and contact points are carried by and move bodily with a swinging hanger which itself moves pendulously to maintain a vertical position when the camera is tipped above or below the horizontal, all as hereinafter more specifically described.

The invention will be best understood by reference to the accompanying drawings wherein:

Fig. 8 is a rear face view of the casing of the device;

Fig. 9 is a transverse sectional view through the device upon line 9—9 of Fig. 8;

Fig. 10 is a perspective, exploded view of the pendulously mounted hanger and its associated parts; and Fig. 11 is a plan view with the top of the casing removed, and the casing walls in section.

Like numerals designate corresponding parts in all of the figures of the drawings.

Figure 6:
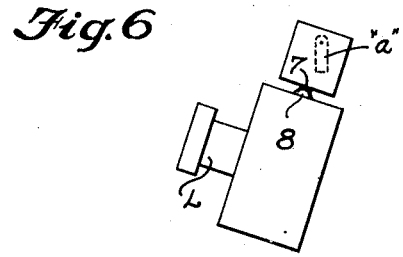

In the particular form of the invention which I have chosen for purposes of illustration 5 designates a box-like casing adapted to be mounted upon a conventional camera 6, through the medium of stem 7 or any other suitable type of support. In Fig. 6 I have indicated that stem 7 may carry a conventional rubber suction cup 8 for engagement with the camera, but the stem could be threaded for engagement in the usual tripod receiving socket of the camera. The means for mounting the box on the camera may vary widely within the field of conventional clips and brackets since the mounting is a fixed one and the casing 5 does not move with respect to the camera.

Figure 7:
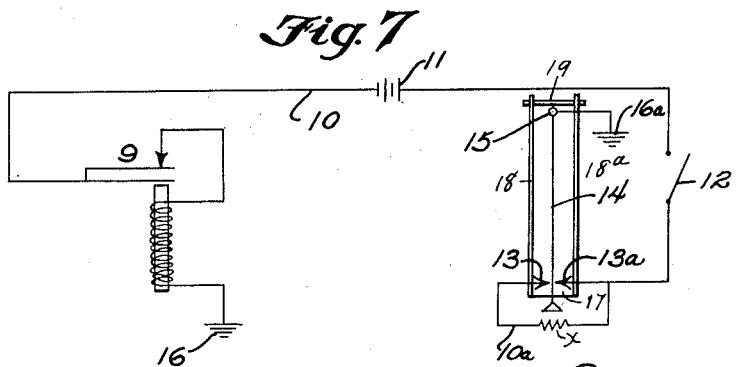
Fig. 7 is a diagram of an electric circuit which may be employed.

The signalling mechanism contained within the casing 5 is diagrammatically illustrated in Fig. 7. The audible element consists of a buzzer 9 that is included in a circuit 10. This circuit includes a source of power, such as a small battery 11, a switch 12, a pair of contact points 13, 13a, a pendulum 14 that is mounted to swing on pivot 15, with suitable grounds at 16, 16a. A branch wire 10a which connects contact 13 into the circuit may have a small resistance x included in its length, to vary the tone of the buzzer as between the two contact points, so that the user may determine which way the camera is tilted.

In Figs. 9 to 11 it is shown that the pendulum 14 and its pivotal mounting 15 are supported from a connecting wall 17 which ties together two wings 18, 18a and in which wings the contacts 13, 13a have threaded mounting so that they may be adjusted toward and from each other.

The wall 17, and wings 18, 18a are rigidly united, present a unitary structure that is U-shaped in horizontal section and as a whole constitutes a swinging hanger a by being pendulously hung upon a shaft 19 that is supported in spaced ears 20 of a plate 21. Plate 21 has a fixed stud 21a projecting from its rear side which passes through the rear wall 56 of casing 5 and has an operating knob 22 upon its outer end, said knob lying on the outside of the case. The switch 12 may also be mounted on this wall of the casing as indicated in Fig. 8. The knob is provided with a pointer 23 which indicates the position to which plate 21 has been turned; that is whether it has been set for conditions where the camera occupies the position of Fig. 1 or whether it is set for the camera to be standing on end as in Fig. 2. The mounting of the parts as shown in Fig. 10 provides what is, in effect a universal mounting for pendulum 14 so that this member will hang vertical throughout all of the camera positions illustrated in Figs. 1 to 6.

Figure 1:
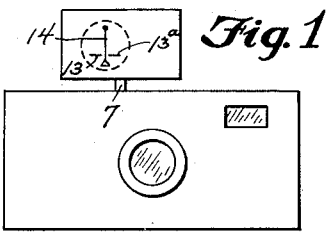
Figs. 1 to 6 are diagrammatic views, hereinafter discussed.

In Fig. 1 the camera is resting base down with the lens axis horizontal and in a level position.

Here pendulum 14 hangs vertically and equidistantly spaced from the contact points 13, 13a.

Figure 2:
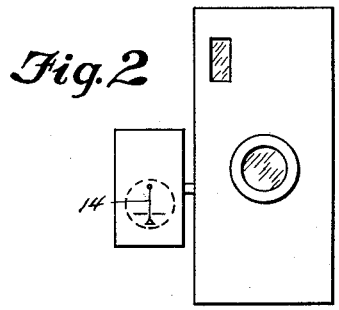

In Fig. 2 the camera stands on end, plate 21 has been rotated by knob 22 through an arc of 90° and with the camera level the pendulum still lies equidistantly spaced from the contacts.

Figure 3:
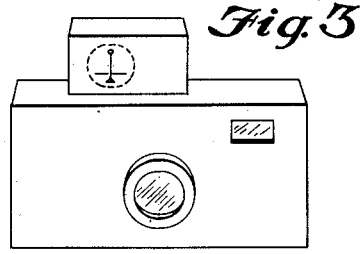
Figure 4:
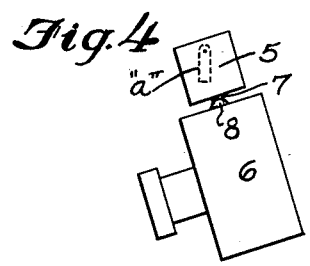
Figure 5:
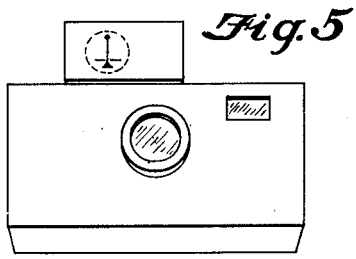

In Figs. 3 and 4 the camera has been tilted to point the lens downwardly. With the camera level from end to end the pendulum still lies vertical and equidistantly spaced from its contacts 13 and 14 because, while the camera and casing 5 have been tipped forwardly the swinging hanger a has swung upon its pivot 19 to maintain its vertical position and also to maintain the vertical position of pendulum 14, which moves bodily with said hanger. The same action takes place in the case of Figs. 5 and 6 where the camera lens L has been pointed upwardly, the hanger remaining vertical as the casing 5 tips in the opposite direction.

It is common practice to provide operating knobs, such as 22 with detents to hold them at their opposite limits of movement and I may utilize this means or conventional stop pins for limiting the throw of plate 22 to 90° degrees in each direction.

Since many ways will readily suggest themselves to those skilled in the art of varying the described construction to get the same result by other means I wish it to be understood that the invention is not limited to the precise construction set forth but that it includes within its purview whatever changes fall within either the terms or the spirit of the appended claims.

Having described my invention what I claim is:

1. A leveling device comprising an electric circuit which includes a source of power, an audible signal energized by said source of power, a pendulum contact, a pair of contact points between which said pendulum swings, a mounting for the pendulum bodily adjustable with the pendulum through an arc of 90 degrees, said mounting of the pendulum being itself mounted for swinging movement in a plane perpendicular to the plane of movement of the pendulum.

2. In a device of the character described the combination with a casing of a plate pivoted upon a wall of the casing for turning movement through an arc of 90 degrees, means upon the exterior of the casing for turning said plate, a hanger pivoted adjacent its top upon said plate and having its lower end swinging toward and from said plate, said hanger comprising a pair of spaced wings, contact points supported by said wings adjacent their lower ends, a pendulum having its lower portion disposed between said contact points and its upper end pivoted upon a member carried by and bodily movable with the hanger and which forms an axis that is perpendicular to the axis about which said hanger swings, said pendulum swinging about its axis in a plane that is perpendicular to the plane in which the hanger swings to make contact with one or the other of the contact points, an electrically actuated signal and an electric circuit which includes said contacts, said pendulum, said signal and a source of power.

3. A structure to aid in leveling devices which in normal use are shifted from a horizontal position to a vertical position in a lateral plane and are also tipped fore and aft across said plane, said structure comprising a casing, means for securing said casing to the device to be leveled to tip therewith in all directions, said casing comprising a wall, a shaft mounted to turn in said wall, an operating handle upon the shaft outside of the casing movable through an arc of 90°, a pair of spaced members secured to the shaft and projecting away from said wall, a pivot extending between and supported by said spaced members, a hanger comprising a flat plate and a pair of forwardly extending wings, the upper portions of said wings being hung upon said pivot to mount the hanger as a whole to swing toward and from the said wall of the casing, a pivoting means projecting forwardly from said flat plate near the upper end thereof, a pendulum hung upon said pivoting means of a length to have its lower end swung toward and from the lower portions of and between said wings, a contact screw threaded in each of said wings and in the path of movement of the pendulum and an electric circuit including the pendulum, the contact points, a source of E. M. F. and an electric signal.

GARLAND J. MORRIS.

REFERENCES CITED

The following references are of record in the file of this patent:

UNITED STATES PATENTS

| Number | Name | Date |
| --- | --- | --- |
| 1,175,062 | Johnson | Mar. 14, 1916 |
| 1,393,318 | Saxton | Oct. 11, 1921 |
| 1,484,502 | James | Feb. 19, 1924 |
| 1,743,711 | Field | Jan. 14, 1930 |
| 2,075,040 | Kieber | Mar. 30, 1937 |